United States Patent Office 2,733,996
Patented Feb. 7, 1956

2,733,996
PROCESS OF MAKING BRICKS

August Leht, Hagersten, Stockholm, Sweden, assignor of twenty per cent to Mrs. Anna Ennok, New York, N. Y., and Magnus Bjorndal, Weehawken, N. J.

No Drawing. Application September 5, 1952, Serial No. 308,149

5 Claims. (Cl. 106—97)

The present invention relates to a process of making artificial stones without burning, which stones have great strength and may be used as bricks and plates in masonry and for pavements, for roofing purposes, as wall and floor plates, etc.

The invention is mainly characterized thereby that a mixture of clay, a magnesium-silicon-fluor-compound and common salt or calcium chloride, and possibly also a filler, is compressed to the desired shape under high pressure and is then allowed to harden.

For the explanation of the invention reference is had to the following examples.

Example 1

Raw clay is dried at a suitable temperature, for instance from 300 to 400° C. until the main portion of the chemically bound water has been removed whereupon the dried product is ground to a fine powder.

To 75 parts by weight of the dry finely ground clay there are added 15 parts by weight of a 10% solution of common salt and 10 parts by weight of a 5% solution of $MgSiF_6.6H_2O$ whereupon the whole is agitated and intimately mixed. Then 10 parts by weight of sand, 10 parts by weight of cement and 5 parts by weight of quicklime (CaO) are added. After further mixing and stirring during a short time the humid mass thus obtained is pressed in a suitable press, for instance a hydraulic press, to the desired shape. The pressure should preferably be at least 100 kgs./cm.$^2$. After removal from the press the article hardens in 24 hours and is then ready for use. According to this example bricks for masonry may advantageously be produced.

Example 2

The steps are the same as in Example 1 but the magnesiumsilicofluoride ($MgSiF_6.6H_2O$) is replaced by the compound $MgSiF_6.6H_2O.NH_4Al(SO_4)_2$—an alum. From this mass excellent stones and plates for roofing purposes may be produced.

In the above examples the sodium chloride solution may be replaced by a solution of calcium chloride.

Cement and burnt lime give increased strength to the artificial stones but are not necessary.

The compression of the shaped bodies under high pressure is of great importance for their hardening. It is necessary to apply this pressure momentarily only whereupon the shaped bodies are removed from the press and are allowed to harden.

Various modifications of the process are, of course, conceivable within the scope of the claims.

I claim:

1. A process of the character described for producing bricks, comprising the following steps—taking 75 parts by weight of finely ground, dried clay, adding 15 parts by weight of a 10% solution of sodium chloride, and 10 parts by weight of a 5% solution of $MgSiF_6.6H_2O$; agitating this mixture until intimately mixed, then adding 10 parts by weight of Portland cement and 5 parts by weight of quicklime, mixing and stirring until homogeneous, placing in a form, subjecting material in the form to a pressure of at least 100 kg./cm.$^2$, removing formed article and air drying for 24 hours.

2. A process of the character described in claim 1 where the 15 parts by weight of 10% sodium chloride solution are replaced by an equal amount of solution of calcium chloride.

3. A process of the character described in claim 1 in which the magnesiumsilicofluoride ($MgSiF_6.6H_2O$) is replaced by a corresponding amount of $$MgSiF_6.6H_2O.NH_4Al(SO_4)_2$$

4. A process of the character described in claim 1 in which the 10 parts by weight of Portland cement and 5 parts by weight of quicklime are eliminated.

5. A process of the character described in claim 1 where the clay is heated to a temperature of between 300 and 400 deg. C. before being finely ground and mixed with the other ingredients.

References Cited in the file of this patent
UNITED STATES PATENTS

| | | |
|---|---|---|
| 1,900,212 | Watson | Mar. 7, 1933 |
| 2,195,586 | Snell | Apr. 2, 1940 |
| 2,195,587 | Snell | Apr. 2, 1940 |